Dec. 15, 1925. Re. 16,224
D. B. REPLOGLE
PNEUMATIC CLEANER
Original Filed June 5, 1916
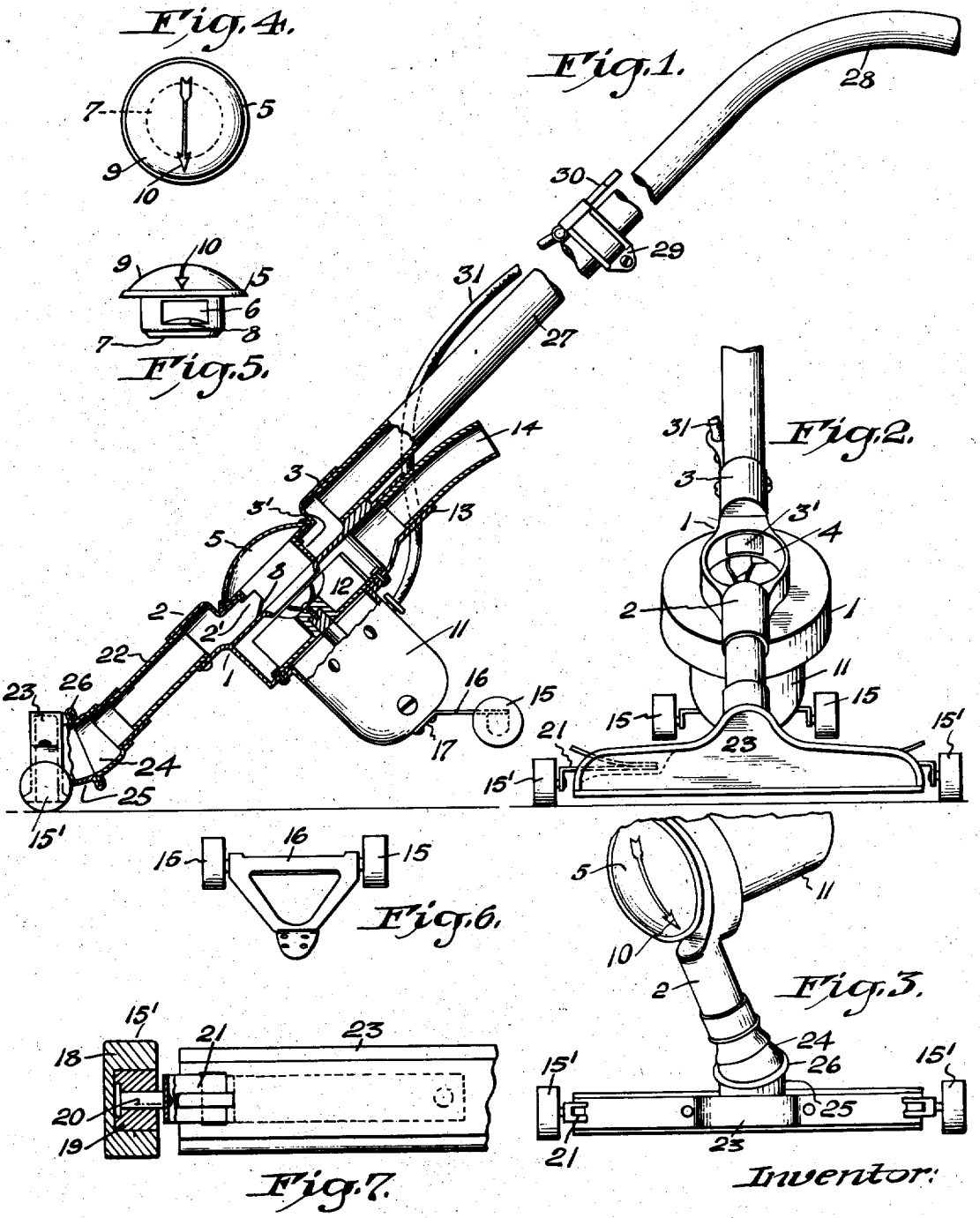
Inventor:
D. B. Replogle Reissued Dec. 15, 1925. Re. 16,224

UNITED STATES PATENT OFFICE.

DANIEL B. REPLOGLE, OF BERKELEY, CALIFORNIA.

PNEUMATIC CLEANER.

Original No. 1,345,550, dated July 6, 1920, Serial No. 101,695, filed June 5, 1916. Application for reissue filed October 22, 1921. Serial No. 509,710.

*To all whom it may concern:*

Be it known that I, DANIEL B. REPLOGLE, a citizen of the United States, residing at Berkeley, in the county of Alameda and State of California, have invented a new and useful Pneumatic Cleaner, of which the following is a specification.

This invention relates to manually portable pneumatic cleaners, and has for its objects, improvement in the form, service, convenience and durability of such devices.

In the accompanying drawing the construction and arrangement of the parts and the entirety of the invention is illustrated sufficiently for others to make and use the same.

Referring to the drawing Figure 1 is a side elevation, partly in central cross-section, and with parts broken away, of one of my improved cleaners. Fig. 2 is a front view of the lower part of same, but with the indicator cap valve member removed. Fig. 3 is a view of the lower portion of the device when manipulated to sweep within the narrower vertically restricted places, as under furniture. Figs. 4 and 5 are top and side views respectively, detailing the indicator valve member. Fig. 6 details roller supports which are attached to the motor used. Fig. 7 details one of the rollers in an enlarged cross-section, and shows its attachment to a roller support of the floor tool.

In the several views, like and similar parts are designated by similar characters.

The part designated 1 is a valve casing member with a fan-case on its under side, said member having tubular socket conduit arms 2 and 3, each communicating with a central chamber 4 having cylindrical sides. Into this chamber fits, revolubly, the indicator valve member 5 which has a side port 6 adapted to register with either the port 2′ or the port 3′ of the member 1; and has also a bottom port 7 leading into the fan centre during operation. The lower side of the port 6 is bounded by a deflecting lip 8 designed to direct entering dust against the transparent top 9, which is larger in diameter than the body of the valve part of the member, so as to give an ampler space in which entering dust may whirl so as to be visible to observers. An indication mark, as the arrow 10 is desirable to show which way the valve is turned.

Bolted to the underside of the member 1, is the motor 11, driving the fan 12, axially at substantially a perpendicular to the line of the handle and the conduit arms 2 and 3; so that the common axes of the motor and fan are inclined downwardly and rearwardly, when the hand is inclined to the normal working position.

An exhaust 13 fitted with a nipple 14 is arranged to lead the sweepings thru a hose pipe or into a dust bag or other collector that the user may prefer.

The motor is furnished with supporting rollers 15, 15 carried by a bracket 16 secured to the motor at 17. The bracket supporting rollers are similar in construction to the rollers 15′, 15′ attached to the spring supports of the floor tool. These rollers, from the nature of their use, are specially constructed for this device. The outer covering 18 is a cap-shaped tire, slid over a spool 19 of antifriction material to which it is securely joined with cement, the pin 20 on which the same is to freely turn, having been first inserted. The inner end of the pin 20 is then riveted to a lug of the spring roller support 21, which is removably inserted into a socket in the end of the floor tool 23.

A section of the pipe handle 22, extending from the arm 2 and communicating with the passage or port 2′, operably connects the floor tool by means of a swivel joint composed of two members 24 and 25, the member 25 having a hooked-over flange embracing loosely a flat flange of the member 24, so that the parts may rotatably slide or turn on each other at the annular joint 26 thus formed. The spring supports 21, 21 while normally holding the mouth of the floor tool above the floor, are adapted to be compressed so that the floor covering may be brought into contact and then held by the suction against the mouth of the floor tool, thus permitting the air to be drawn thru from the underside of the carpet or covering.

A longer section of pipe 27, fitted into the arm 3 and operably connecting with the port 3′ also serves as the main part of the handle of the device. A clamp 29 anchoring an electric connector member 30 attachable to the conduction cord 31, is secured to this part of the handle, and the handle is further provided with a curved end 28, to which a suction hose or any cleaning tools made for suction apparatus of this kind, may be operably attached. The sections of pipe are preferably of harl fibre which is light and a non-conductor of electricity, as well as smooth and agreeable to the hand. The floor tool is also preferably of similar material, which neither abrades nor discolors the fabrics to be cleaned.

In the operation of the device, in sweeping, the rollers 15, 15, ordinarily are held clear of the floor by lifting the handle; but to pass over the edges of rugs and the like, the device may be rested and tilted on them by lowering said handle. The projecting motor 11, while serving to give position to the rollers, also acts as a weight on the underside, giving the device a normal hang for service, and inclining the casing when tilted sidewise so as to clear furniture or other vertical obstructions.

Raising the outer end of the handle also serves to transfer the main weight of the motor from its roller supports to those of the floor tool, compressing its spring supports and bringing the tool mouth into normal contact with the floor. In this way the tool neither scrapes injuriously on the carpets nor is it held so high that a too free entry of air is permitted, for effective cleaning.

By a swinging of the motor on the axis of the pipe handle, or by laying it over by moving the handle thru an arc described on an axis passing thru the swivel joint and the supporting roller of the motor on which it then tilts, it is apparent the floor tool will assume different angular positions with reference to the common plane of the handle and motor axis. In this manner the mouth of the floor tool is maintained in operative relation to the floor, while the motor and handle may be swung over until the common plane of their axes is nearly parallel to the floor as shown in Fig. 3. Spaces under furniture may be reached and cleaned conveniently, in this way by my device.

In addition to these advantages of my construction, other out-of-the-way places may be reached by applying the end 28 of the handle. This may be done by applying the end of the handle direct, by extending it with rigid tubing, with flexible tubing, or by equipping the end of the handle, or any extension thereof with any suitable form of suction tool or cleaning device. Suction produced by driving the exhaust fan 12, causes air to rush in from the floor tool, or from the outer end of the handle, according as the port of the indicator valve is turned to register with the port 2′ or the port 3′.

The machine is also adapted to be picked up bodily using the section 22 as one of the handles, and when so held the indicator cap is in convenient position to be turned by hand, removed, or for the visibility of passing dust. When thus held, let it also be noticed, the swiveled floor tool with the rubber-capped rollers, may unobtrusively aline with the motor axis, or with the forearm of the operator, causing no interference or damage to clothing.

The several pairs of rollers may lie in common planes or in diverse planes due to the angularity of the plane of rotation of the member of the swivel joint.

The indicator top, when running the device under furniture, due to the angularity of position assumed, instead of being hidden from view, faces outwardly and upwardly in normal line of vision of the eye of the stooping operator. This indicator member is also readily removable so as to provide ready access to the fan, should anything become entangled upon it during operation.

Were the rollers not covered over, the ends of exposed spindles also would be liable to scratch base boards while working beyond the sight of the operator, as under furniture and were they not removable, it would be less easy to clean close to the edges of base boards. Thus it appears that a number of novel features cooperate to advantage in this form of cleaner, yet the exact details of construction may of course be modified without departing from the spirit of the invention.

Having thus described the invention, what I claim and desire to secure by Letters Patent is:

1. In a manually portable vacuum cleaner, the combination with a member having tubular socket conduit arms carrying vacuum producing means, of a plurality of suction pipes operably connected to said arms, and adapted to connect with suction tools at their outer ends.

2. In a manually portable vacuum cleaner of the kind described, a plurality of suction pipe handles, adapted to connect with cleaning tools at their outer ends, and operably connecting to a common port member carrying vacuum producing means and means for controlling the ports of said member.

3. In a portable pneumatic cleaner, the combination of suction producing means, a pair of tubular socket conduit arms connecting with said means and a pair of suction pipe handles, in axial alinement, connecting with said arms, and adapted to connect with cleaning tools at their outer ends.

4. In a manually portable vacuum cleaner, suction producing means, a member having a central port and two axially alined tubular socket conduit arms, carrying said means and having a pair of suction pipes operably connecting with said means, together with means for directing suction thru one or the other of said pipes.

5. In a manually portable pneumatic cleaner, suction producing means, a valve casing member carrying said means, said member having a cylindrical chamber, a pair of side ports leading from opposite sides of said chamber, pipes operably connecting with said side ports and adapted to connect with suction tools at their outer ends, and a cylindrical valve member revolubly fitted into said chamber and adapted to seal and open said ports interchangeably.

6. In a manually portable suction cleaner, the combination with a suction pipe handle adapted to connect with cleaning tools at its outer end, of suction producing means operably connected on the underside of said handle, a separate floor cleaning tool operably connected with the suction producing means, the said suction producing means provided with supporting rollers arranged to serve as a fulcrum to tilt the cleaning tool from the floor in the operation thereof.

7. In a manually portable pneumatic cleaner, a central valve casing member, suction producing means carried thereby, a suction pipe handle and a floor tool operably connected to said valve casing member, together with a rotating valve in said valve casing member arranged for interchangeably opening and closing off the suction thru said handle and floor tool.

8. In a manually portable pneumatic cleaner having a floor tool, a suction pipe handle and suction producing means operably mounted upon a side of said handle, a curved portion on the outer end of said suction pipe handle, curved to the side of the handle on which the suction producing means is connected, roller supports arranged to support the device in a working position, having the main part of the suction pipe handle thereof, normally at an incline, and the outer extremity of the curved part normally horizontal.

9. In an air cleaning device, suction producing means, operably connected sections of suction pipes leading from opposite directions to said means and operatively joining thereto, a transparent-topped rotatable controlling valve at the junction of said pipes and suction producing means, said valve being removable and replaceable and adapted for observation as well as interchangeably directing air currents or suction from the oppositely leading sections of pipe.

10. A manually portable cleaning device comprising a fan-case, a cleaning tool, a handle having a tubular part operably connecting said tool to the fan-case; a fan and a motor for driving the same, the common axes thereof extending at substantially a perpendicular to said handle and rigidly secured in said position.

11. A suction cleaner casing, in combination with a fan and motor, their common axes downwardly and rearwardly inclined.

12. In combination with a pneumatic cleaner, the herein described revoluble valve member comprising a hollow cylindrical body having a side port and a bottom port adapted to conduct the passage of air therethru in cleaning, and further comprising a body extension of larger diameter, annularly disposed around one end of the said cylindrical body, providing ampler space for whirling dust carrying air; means for directing thereinto the dust carrying air from the air passages of the cleaner and whirling the same within the ampler space aforesaid, and a transparent cover enclosing the larger diameter end of the body of said valve member, together with means for operably and detachably connecting the valve member to the cleaner.

13. A suction cleaner having a suction chamber, a fan chamber and a motor arranged in the order indicated from front to rear, the common axes of fan and motor downwardly and rearwardly inclined.

14. A suction cleaner casing in combination with a fan and motor, their common axes downwardly and rearwardly inclined, the lowest part of the motor being approximately in the same plane as the lowest part of the casing.

15. A suction cleaner having a suction chamber, a fan chamber and a motor arranged in the order indicated from front to rear, the common axes of fan and motor downwardly and rearwardly inclined, the lowest part of the motor being approximately in the same plane as the lowest part of the suction chamber.

In witness whereof I have hereunto set my hand at Washington, D. C., this 22 day of October, 1921.

DANIEL B. REPLOGLE.